United States Patent
Adhikari et al.

(10) Patent No.: US 8,144,583 B2
(45) Date of Patent: Mar. 27, 2012

(54) NETWORK SWITCH THAT IS OPTIMIZED FOR A TELEPHONY-CAPABLE ENDPOINT

(75) Inventors: Akshay Adhikari, Basking Ridge, NJ (US); Sachin Garg, Green Brook, NJ (US); Anjur Sundaresan Krishnakumar, Rocky Hill, NJ (US); Navjot Singh, Denville, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1127 days.

(21) Appl. No.: 11/610,487

(22) Filed: Dec. 13, 2006

(65) Prior Publication Data

US 2008/0144499 A1    Jun. 19, 2008

(51) Int. Cl.
*H04L 12/26* (2006.01)
(52) U.S. Cl. .......... 370/232; 370/391; 709/232
(58) Field of Classification Search .......... 370/229, 370/230, 232, 351, 357, 358, 360, 362, 389, 370/391, 392, 395.1, 395.2, 395.21; 379/90.01, 379/93.01, 93.09; 710/1, 58, 60
See application file for complete search history.

(56) References Cited

U.S. PATENT DOCUMENTS

| | | | |
|---|---|---|---|
| 5,604,735 A * | 2/1997 | Levinson et al. | 370/360 |
| 6,148,002 A | 11/2000 | Patel et al. | |
| 6,445,707 B1 * | 9/2002 | Iuoras et al. | 370/395.43 |
| 6,741,559 B1 | 5/2004 | Smeulders et al. | |
| 2001/0050912 A1 * | 12/2001 | Malalur et al. | 370/357 |
| 2003/0191854 A1 * | 10/2003 | Hsu et al. | 709/233 |
| 2004/0223462 A1 | 11/2004 | Cromer et al. | |
| 2005/0089037 A1 | 4/2005 | Kojima | |
| 2006/0023697 A1 * | 2/2006 | Shore et al. | 370/352 |
| 2006/0092944 A1 * | 5/2006 | Wingard et al. | 370/395.2 |

FOREIGN PATENT DOCUMENTS

| | | | |
|---|---|---|---|
| EP | 0986217 A2 | | 3/2000 |
| GB | 2389022 A | * | 11/2003 |
| JP | 2005-223394 A | | 8/2005 |

OTHER PUBLICATIONS

Lastoria, Gianluca, "EP Application No. 07024214.4—2416 / 1933510 Extended Search Report Mar. 26, 2009", , Publisher: EPO, Published in: EP.
Lastoria, Gianluca, "EP Application No. 07024214.4 Office Action Jul. 26, 2010", , Publisher: EPO, Published in: EP.
European Patent Application No. 07024214.4, Communication dated Jul. 29, 2011, Avaya Technology LLC, 4 pages.

* cited by examiner

*Primary Examiner* — Seema S Rao
*Assistant Examiner* — Khoa Huynh
(74) *Attorney, Agent, or Firm* — Maldjian Law Group LLC; John P. Maldjian, Esq.; Alexander D. Walter, Esq.

(57) ABSTRACT

A method is disclosed that enables the avoidance of a processor overload of a telecommunications endpoint device that is susceptible to traffic floods. An enhanced network switch sets the speed on one of its data ports as a specific function of the speeds of the devices that are connected to one or more of its other data ports. This behavior is different from that of network switches in the prior art, in which the data rate of a port in the prior art is auto-negotiated to the highest speed that can be supported by the network elements at either end of the port's connection, regardless of the other devices present. By considering the specific devices that are connected, the enhanced network switch is able to limit the amount of traffic that is directed by an upstream device, such as a router, towards a device with limited processor capability, such as a packet-based phone.

15 Claims, 5 Drawing Sheets

NETWORK SWITCH THAT IS OPTIMIZED FOR A TELEPHONY-CAPABLE ENDPOINT

FIELD OF THE INVENTION

The present invention relates to telecommunications in general, and, more particularly, to mitigating the effects of a packet attack on a telephony-capable endpoint that is connected to a network switch.

BACKGROUND OF THE INVENTION

FIG. 1 depicts a schematic diagram of telecommunications system 100 in the prior art. System 100 routes voice conversations, or other types of media such as video, between telephony-capable network elements such as telephones. System 100 comprises network switch 101, router 102, Internet Protocol packet network 103, and endpoint network elements 104-1 through 104-M, wherein M is a positive integer. The elements depicted in FIG. 1 are interconnected as shown. In FIG. 1, two types of networks are represented: an Internet Protocol (IP) packet network, which is depicted by network 103, and a local area network (or "LAN"), which comprises network switch 101 and the network elements that are connected to the switch.

Network switch 101 is a networking device that provides for the local distribution of signals. Switch 101 distributes the signals by filtering and forwarding packets between segments in the local area network that the switch serves. Switch 101 comprises a plurality of data connection ports and relays traffic from one connection port to another other in a transparent manner. At most, one network element is connected to any port at switch 101; in this way, switch 101 is distinguished from another type of networking device called a bridge, in that a bridge can have more than one network element that uses the same connection port. Switch 101 operates in accordance with the networking protocol of the particular local area network that it serves, which in this case is the Ethernet protocol.

Since the only devices on each LAN segment are switch 101 and the network element node connected to each port, switch 101 picks up every transmitted packet before the packet reaches another node. The switch then forwards the packet over the appropriate segment. Since any segment contains only a single node, the packet only reaches the intended recipient and does not interfere with the transmission of another packet by another node, thereby enabling many calls to occur simultaneously.

In typical use, one of the ports of switch 101 is connected to a router, such as router 102 described below, or to another switch. It is this port through which endpoint network elements 104-1 through 104-M gain access to another network than the network served by network switch 101. Note that there is nothing unique about the port to which the router is connected—that is, the port to which the router is connected can be any of the ports of switch 101.

Router 102 is a networking device that forwards data packets along networks, in this case between the local area network served by network switch 101 and Internet Protocol packet network 103. Router 102 routes packets at the network layer (i.e., layer 3) of the Open System Interconnection (OSI) reference model. As a device that is closer to a "backbone" network, such as Internet Protocol packet network 103 described below, router 102 is considered to be an "upstream device" or is referred to as being "upstream" of network switch 101.

Internet Protocol packet network 103 is a backbone network that is used to transport one or more types of media, such as Voice over Internet Protocol (or "VoIP"). Network 103 comprises one or more transmission-related nodes such as routers that are used to direct data packets (e.g., voice packets, etc.) from one or more sources to the correct destinations of those packets. Network 103 is capable of handling Internet Protocol-based messages that are transmitted among the network elements that have access to network 103, such as the endpoint network elements and gateways (not shown). Although IP network 103 as depicted is a Voice-over-IP service provider's network, network 103 could alternatively be the Internet or some other type of Internet Protocol-based network.

Endpoint network element 104-$m$, for m=1 through M, is a local area network-based device such as a telephone, (e.g., deskset, softphone, etc.), a computer (e.g., desktop computer, portable computer, etc.), and so forth. As an endpoint, network element 104-$m$ enables its user to access other devices throughout telecommunications system 100, such as host computers or other endpoints that are accessible to network element 104-$m$ only through IP packet network 103.

In order to support each endpoint network element 104-$m$ that is connected to it, network switch 101 has to be able to communicate with each connected device through a communication protocol such as Ethernet that the connected devices and switch 101 all recognize. The Ethernet standard that governs network switch 101 supports different speeds of operation at the switch, including 10 Megabits/second, 100 Megabits/second, and 1 Gigabit/second. Modern network interface cards (or "NIC") can operate at more than one of these standard speeds. For example, a "10/100" NIC can operate at either 10 Megabits/second or 100 Megabits/second. The actual speed of operation is set either by configuration or by a process known as auto-negotiation. In auto-negotiation, the NICs of the elements at either end of each connection set the speed based on the fastest rate that can be supported by both. Thus, a 10/100/1G NIC and a 10/100 NIC will settle upon 100 Megabits/second through auto-negotiation. Alternatively, the 10/100 NIC at either end can be manually pegged to operate at 10 Megabits/second, in which case the pair of NICs will then settle upon 10 Megabits/second as the common speed of operation. Furthermore, each connection will auto-negotiate its own rate, independent of what is connected to the other ports at switch 101. For example, the link to router 102 might settle on 100 Megabits/second, while the link to network element 104-1 might settle at 10 Megabits/second, while the link to network element 104-2 might settle at 100 Megabits/second.

An endpoint device, such as network element 104-1, often comprises a processor (i.e., a central processing unit) that is able to handle a packet transfer rate (both incoming and outgoing packets) that is considered normal, such as a transfer rate that is specified for a particular mode of real-time voice communication. However, the same processor often cannot handle a packet transfer rate that is associated with a sustained burst of packets, such as during a traffic flood that is either malicious or inadvertent in nature. In addition, the endpoint device's network interface card is typically able to handle a considerably higher influx of packets than the same device's processor is able to handle. Consequently, processor overload can occur when an end-user device is abnormally flooded with packets, if both the upstream link to router 102 and the link to the endpoint device (e.g., network element 104-5, etc.) have settled at any rate that is higher than what the endpoint device's processor is able to handle. Overloading the processor can have undesirable consequences for the operation of the endpoint device as a user's telephony device.

What is needed is a way to avoid overloading an endpoint's processor with packets, without some of the disadvantages in the prior art.

SUMMARY OF THE INVENTION

The present invention enables an avoidance of a processor overload at a telecommunications endpoint device that is susceptible to traffic floods. In accordance with the illustrative embodiment of the present invention, an enhanced network switch sets the speed at one of its data ports—for instance, at a data port reserved for an upstream device such as a router—as a specific function of the speeds of the devices that are connected to one or more of its other data ports. By setting the speed of the data port for the upstream device as both a function of the other devices connected and their speeds, the enhanced network switch of the illustrative embodiment is able to limit the amount of traffic that is directed by the upstream device towards a device with limited processor capability, such as a packet-based phone. For example, depending on the other devices present, the network switch will select the lowest rate in common between itself and the upstream device, or at most a rate that is still sufficiently low enough to avoid overloading the phone's processor. This behavior is different from that of some network switches in the prior art, in which the data rate of a port in the prior art is auto-negotiated to the highest speed that can be supported by the network elements at either end of the port's connection, regardless of the other devices present.

The present invention recognizes that the data rate of the network interface unit of a packet-based phone is often disproportionately high, relative to the low processing power of the phone's central processing unit. Under normal operating conditions, this disproportion does not pose a problem because the normal data rate of incoming packets is adequately handled by the phone's processor. However, when the phone is struck with a packet flood, the phone's processor is often incapable of handling the flood data rate, even though the phone's network interface is still able to handle the flood data rate. The processor overload problem can be mitigated in the prior art by manually configuring the upstream link to operate a lower data rate, thereby limiting the rate at which packets are presented to the phone. Unfortunately, the prior-art technique has the disadvantage of unnecessarily constraining other connected devices to exchange data with the packet network at the lower rate.

In accordance with the illustrative embodiment, the enhanced network switch receives signals from two or more devices being that are connected to the switch, as part of the auto-negotiation process. In some circumstances, the switch sets the speed of the link with the upstream device to the lowest rate supported. Selecting the lowest rate is based on the presence of a particular network element, such as a phone with a marginal processor, or on a device being plugged into a particular port, such as a port marked "phone". In some embodiments, when a third network element such as a personal computer is connected to the network switch, the auto-negotiation rules in the prior art can override the rules of the illustrative embodiment; in this way, the third network element is not penalized in terms of the allowable data rate of packets from the packet network. In some other embodiments, the receive-path link from the upstream device of a full-duplex link can be set to the lowest rate to prevent processor overload, while the transmit-path link can independently be set at the highest rate without an adverse effect on the phone's processor.

The present invention technique, in contrast to the prior art, takes advantage of the fact that upstream network elements tend to be dedicated, high-speed switches or routers with much greater processing capability than a phone and are able to handle much higher rates of traffic. In other words, the enhanced network switch of the illustrative embodiment shifts the responsibility of dealing with a packet flood, whenever possible, to the upstream device.

The illustrative embodiment of the present invention comprises: receiving, at a network switch, a first signal from a first network element and a second signal from a second network element, wherein the first network element is connected to a first data port at the network switch, and wherein the second network element is connected to a second data port at the network switch; determining that the first network element and the second network element are each capable of communicating at least at a first data rate and a second data rate, wherein the first data rate is less than the second data rate; and establishing a link at the first data rate between the first network element and the network switch, wherein the first data rate is selected over the second data rate based on at least one of: (i) a network element being connected to the second data port, wherein the second data port is predetermined, and (ii) the second network element being connected to the network switch, wherein the second network element is predetermined.

DETAILED DESCRIPTION

The term "network element," and its inflected forms, is defined for use in this specification, including the appended claims, as a telecommunications device that is addressable. A network element can be an endpoint device such as a packet-based telephone, a host device such as a computer server, or a networking device such as a switch or router.

Figure 1:
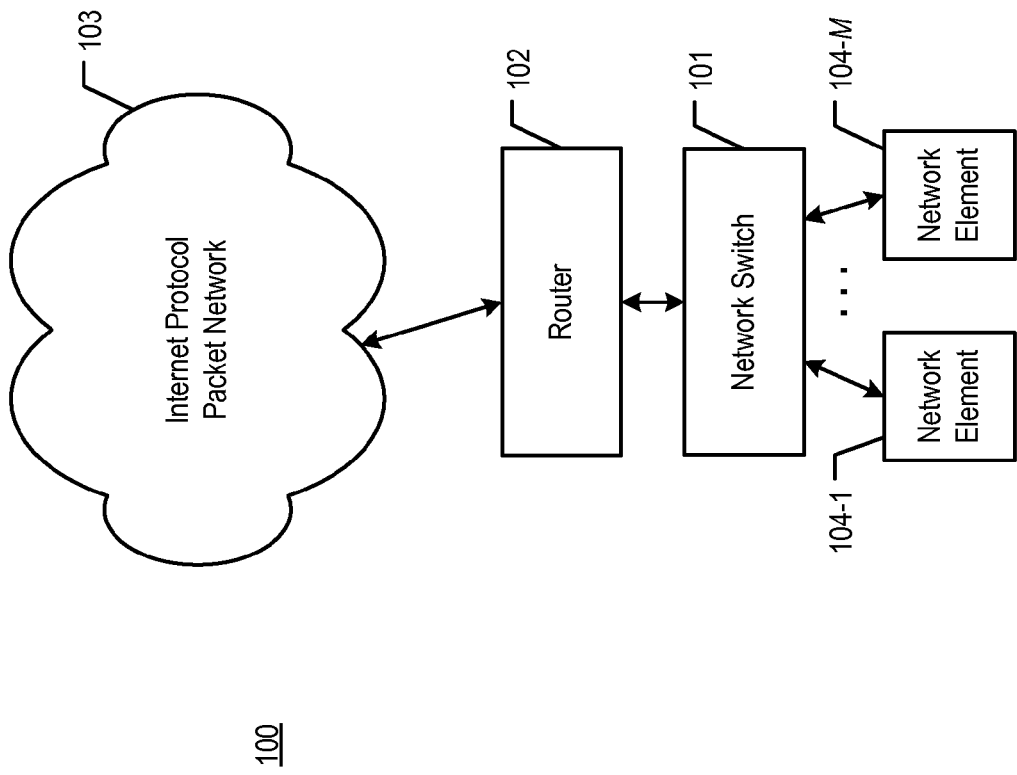
FIG. 1 depicts telecommunication system 100 in the prior art.
Figure 2:
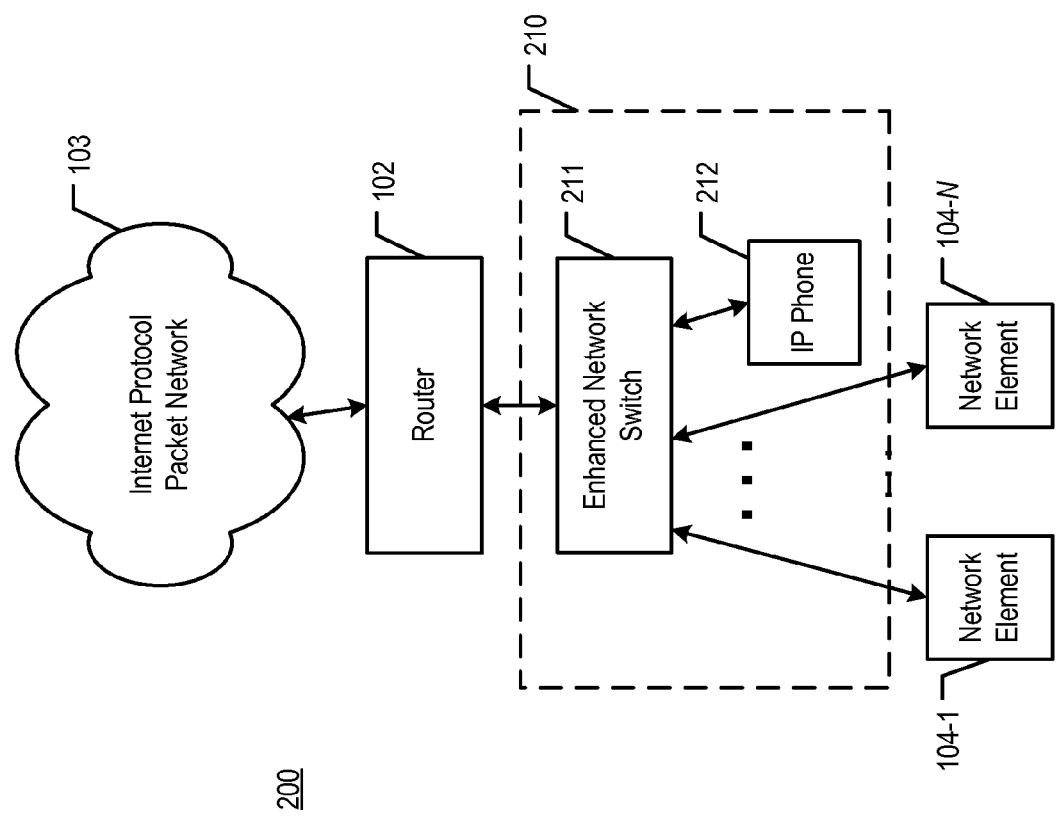
FIG. 2 depicts telecommunication system 200, in accordance with the illustrative embodiment of the present invention.

FIG. 2 depicts telecommunication system 200, in accordance with the illustrative embodiment of the present invention. System 200 comprises router 102, Internet Protocol (IP) packet network 103, and network elements 104-1 through 104-N, wherein N is a positive integer, as well as enhanced network switch 211 and IP-capable phone 212. The elements depicted in FIG. 2 are interconnected as shown. Router 102, IP packet network 103, and network elements 104-1 through 104-N are described above and with respect to FIG. 1.

Two types of networks are represented in FIG. 2. The first is an Internet Protocol (IP) packet network, which is depicted by network 103. The second is a local area network (or "LAN"). The local area network comprises enhanced network switch 211 and the network elements that are connected to the switch (i.e., network elements 104-1 through 104-N and IP phone 212). As those who are skilled in the art will appreciate, other local area networks that serve other network elements can be connected to IP packet network 103.

Enhanced network switch 211 is a networking device that provides for the local distribution of signals, in accordance with the illustrative embodiment of the present invention, the salient components of which are described below and with respect to FIG. 3. Switch 211 distributes the signals by filtering and forwarding packets between segments in the local area network that the switch serves. Switch 211 comprises a plurality of data connection ports and relays traffic from one connection port to another other in a transparent manner. Each data port is able to have a single network element connected to it. Switch 211 operates in accordance with the networking protocol of the particular local area network that it serves, which in the case of the illustrative embodiment is the Ethernet protocol. As those who are skilled in the art will appreciate, however, in some alternative embodiments switch 211 can operate in accordance with a networking protocol other than Ethernet, such as the IEEE 802.11 protocol. It will be clear to those skilled in the art, after reading this specification, how to make and use switch 211.

In accordance with the illustrative embodiment, switch 211 is capable of switching one or more data ports in full-duplex fashion, as is known in the art. For each data port to which a network element is connected, such as router 102, full-duplex switching means that information can travel from the connected device to switch 211 and from switch 211 to the connected device simultaneously, provided that the connected device is also full-duplex capable. Furthermore, for each data port, switch 211 is capable of configuring the data rates of the receive path and transmit path independently of each other. As a result, the data rate selected for the receive path (i.e., the path from the connected device to the switch) can be either the same as or different from the data rate selected for the transmit path (i.e., the path from the switch to the connected device). In some alternative embodiments, switch 211 is capable of half-duplex switching only, as is known in the art, which means that data can be transmitted in only one direction at a time.

As with network switch 101, enhanced network switch 211 is capable of auto-negotiation at each data port. In accordance with the illustrative embodiment, however, the rules that are used to ultimately determine the data rates to take effect at certain data ports are different from those rules used in auto-negotiation in the prior art. The rules of the illustrative embodiment are described in detail below and with respect to FIG. 4.

IP phone 212 is a telecommunications endpoint device that provides access for an end user to the local area network and to IP packet network 103. IP phone 212 can be one of a SIP deskset, an H.323 terminal running on a personal computer, a laptop-based or desktop-based softphone, and so forth. As a packet-based telephone, IP phone 212 digitizes voice signals from its user and formats the digitized signals into transmittable data packets through an audio compressor/decompressor (or "CODEC") circuit. Similarly, the CODEC circuit of IP phone 212 is also capable of receiving data packets and converting the information contained within those packets into voice signals that are understandable by the endpoint user of IP phone 212. It will be clear to those skilled in the art how to make and use IP phone 212.

In accordance with the illustrative embodiment, enhanced network switch 211 and IP phone 212 are integrated into the same physical enclosure, such as that of a telephone deskset. This integration into a single enclosure is intended to provide convenience to an end user by (i) providing switched local area network functionality and telephony functionality in a single unit and (ii) pre-configuring the connection between switch 211 and IP phone 212 within the unit. In some alternative embodiments, however, switch 211 and IP phone 212 can be in separate enclosures and connected together by a cable that is visible to the user.

Figure 3:
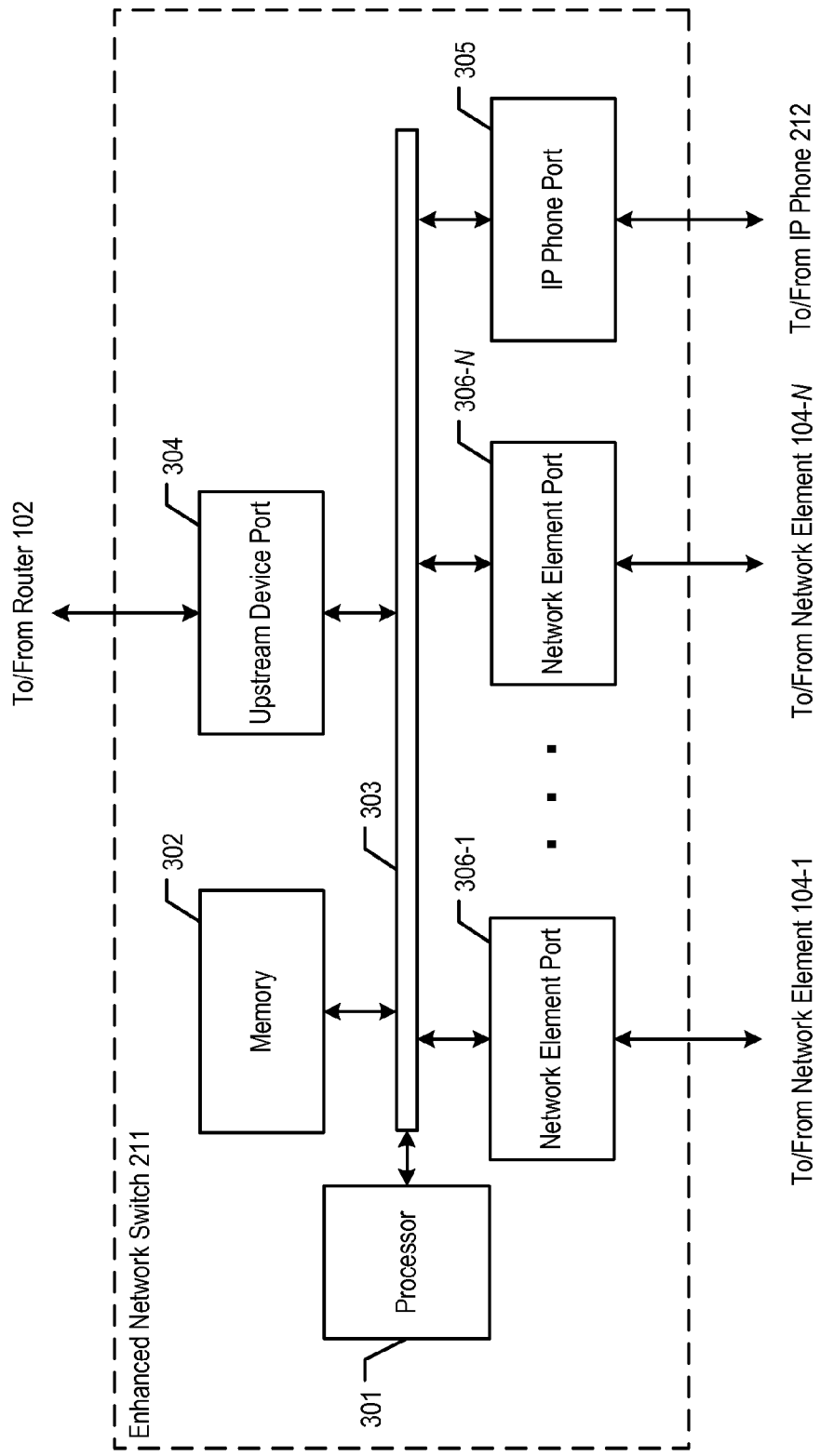
FIG. 3 depicts the salient components of enhanced network switch 211 of system 200.

FIG. 3 depicts the salient components of enhanced network switch 211 in accordance with the illustrative embodiment of the present invention. Switch 211 comprises processor 301, memory 302, bus 303, upstream device port 304, IP phone port 305, and network element ports 306-1 through 306-N, interconnected as shown. As those who are skilled in the art will appreciate, in some alternative embodiments the depicted elements of switch 211 comprise a different allocation of functionality across the elements or are interconnected differently than shown.

Processor 301 is a general-purpose processor that is capable of receiving information from one or more of the data ports (i.e., ports 304, 305, and 306-1 through 306-N) via bus 303, executing instructions stored in memory 302, reading data from and writing data into memory 302 via bus 303, executing the tasks described below and with respect to FIG. 4, and transmitting information to one or more of the data ports via bus 303. In some alternative embodiments of the present invention, processor 301 might be a special-purpose processor. In either case, it will be clear to those skilled in the art, after reading this specification, how to make and use processor 301.

Memory 302 stores the instructions and data used by processor 301. Memory 302 might be any combination of dynamic random-access memory (RAM), flash memory, disk drive memory, and so forth. It will be clear to those skilled in the art, after reading this specification, how to make and use memory 302.

Port 304 is capable of receiving packet signals from a connected, upstream device, which in this case is router 102, and of forwarding the information encoded in the signals to processor 301, in well-known fashion. Port 304 is also capable of receiving information from processor 301 and of transmitting signals that encode this information to the connected, upstream device, in well-known fashion. As port 304 is intended for an upstream device, it can be labeled as such (e.g., "Upstream", "Internet", etc.) so that a user properly connects the cable from the upstream device. It will be clear to those skilled in the art, after reading this specification, how to make and use port 304.

Port 305 is capable of receiving packet signals from a particular, connected, downstream device, which in this case is IP phone 212, and of forwarding the information encoded in the signals to processor 301, in well-known fashion. Port 305 is also capable of receiving information from processor 301 and of transmitting signals that encode this information to the connected device, in well-known fashion. As port 305 is intended for a particular type of downstream device, it can be labeled as such (e.g., "Phone", etc.) so that the user properly connects the IP phone cable. It will be clear to those skilled in the art, after reading this specification, how to make and use port 305.

Port 306-$n$, for $n=1$ through N, is capable of receiving packet signals from a connected, generic network element, such as a user's personal computer or networked printer, and of forwarding the information encoded in the signals to processor 301, in well-known fashion. Port 306-$n$ is also capable of receiving information from processor 301 and of transmitting signals that encode this information to the connected device, in well-known fashion. It will be clear to those skilled in the art, after reading this specification, how to make and use port 306-*n*.

Figure 4A:
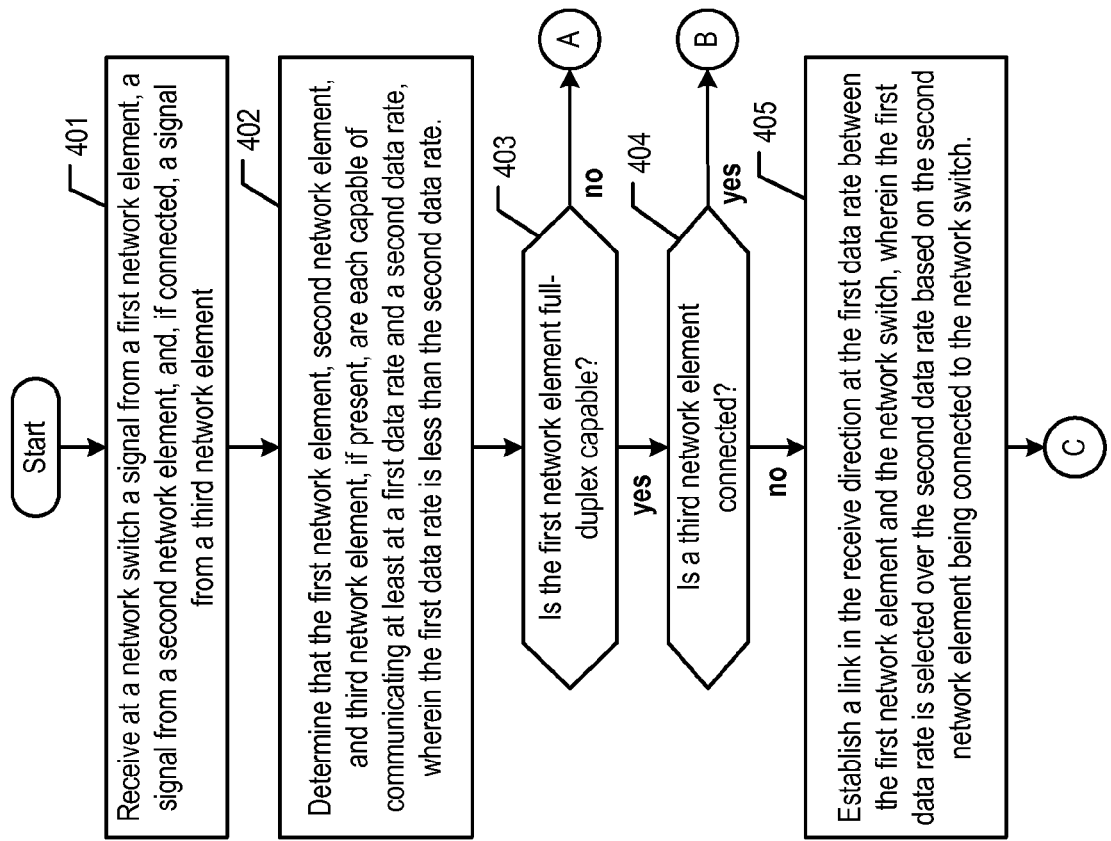
FIGS. 4A and 4B (in combination, referred to as "FIG. 4") depict a flowchart of the salient tasks that are executed by enhanced network switch 211, in accordance with the illustrative embodiment of the present invention.
Figure 4B:
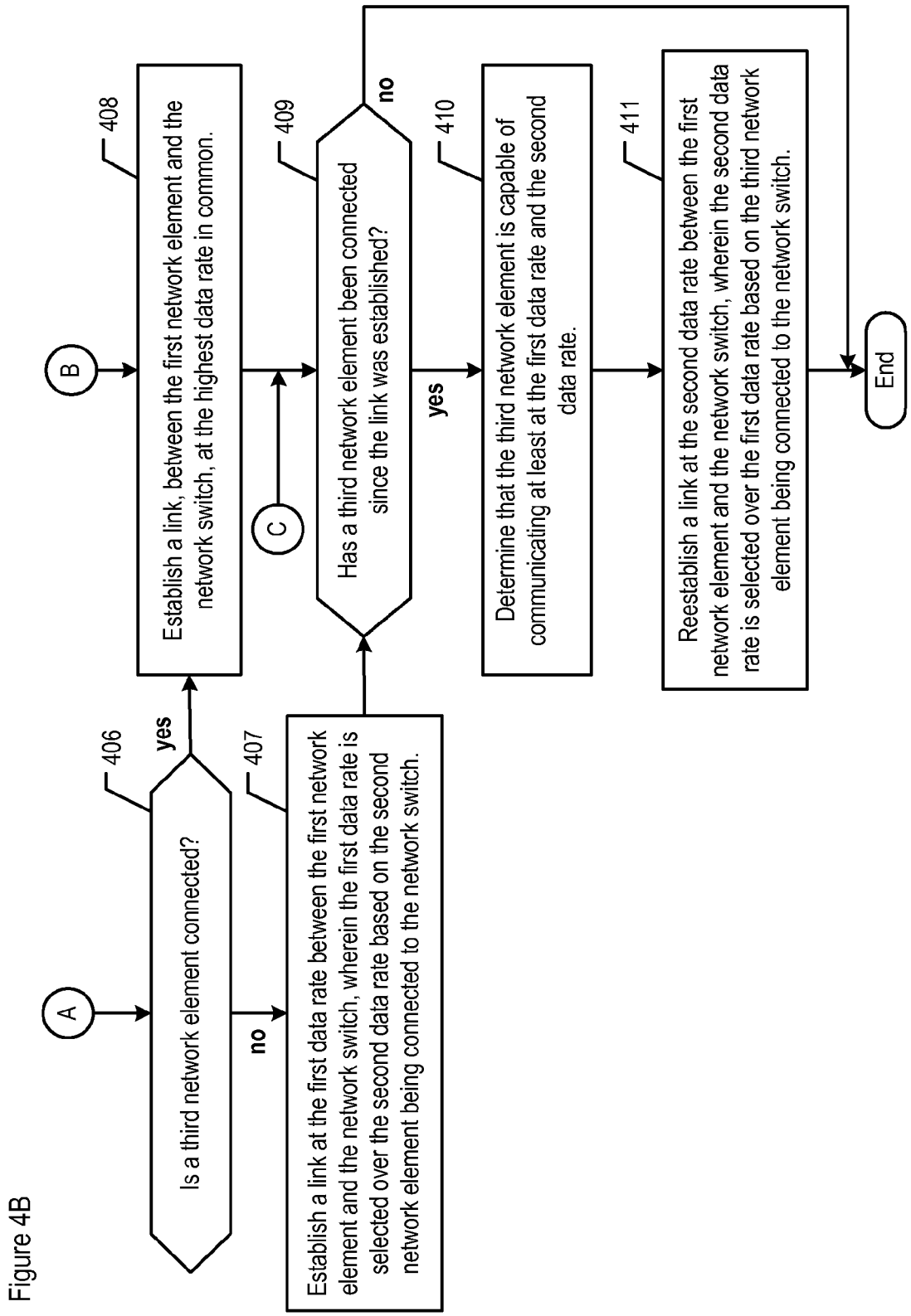

FIG. 4 depicts a flowchart of the salient tasks that are executed by enhanced network switch 211, in accordance with the illustrative embodiment of the present invention. In accordance with the illustrative embodiment, the term "first network element" refers to an upstream device, the term "second network element" refers to a device whose processor needs overload protection, and the term "third network element" refers to a device that does not fit into either of the first two categories. For pedagogical purposes, router 102 is considered to be a first network element connected to switch 211, IP phone 212 is considered to be a second network element connected, and network element 104-1 (e.g., a personal computer connected only for email, etc.) is considered to be a third network element connected. The first, second, and third network element nomenclature is referred to in the described tasks, figures, and appended claims. As those who are skilled in the art will appreciate after reading this specification, a different combination of network elements can represent the first, second, and third network elements that are referred to herein. Furthermore, as those who are skilled in the art will appreciate, some of the tasks that appear in FIG. 4 can be performed in parallel or in a different order than that depicted.

At task 401, switch 211 receives a signal from the first network element, router 102, and the second network element, IP phone 212, which devices are connected to data ports of switch 211. In addition, switch 211 might also receive a signal from the third network element, network element 104-1, if connected to a data port of switch 211. Each received signal is part of an auto-negotiation sequence, which is well-known in the art, and is used to convey data rate information about each connected network element.

In some embodiments, switch 211 also receives signals from one or more of router 102, IP phone 212, and network element 104-1, if present, which signals convey information that correlates to the processor speed, or to some other attribute, of the connected network elements.

At task 402, switch 211 determines, in well-known fashion, that router 102, IP phone 212, and device 104-1, if present, are each capable of communicating at a first data rate (e.g., 10 Megabits/second, etc.) and a second data rate (e.g., 100 Megabits/second, etc.), where the first data rate is less than the second data rate. In accordance with the illustrative embodiment, the first data rate is the lowest data rate that is supported by both router 102 and switch 211. However, as those who are skilled in the art will appreciate, in some alternative embodiments, the first data rate can be the lowest data rate that is supported by all of router 102, switch 211, and another connected network element, where the other connected element might be specifically IP phone 212 or might be any device that is merely connected at a predetermined data port (i.e., port 305). In some other alternative embodiments, the first data rate can be determined based on one or more capabilities, such as processor speed, of IP phone 212, which capabilities have been communicated to switch 211.

Switch 211 might also determine that each connected device is able to communicate at additional data rates that are unique or in common with the data rates that are supported by one or more of the other connected devices. The determination of the data rates is based on the signals received at task 401. In some embodiments, switch 211 also determines whether router 102 is capable of full-duplex communication with switch 211 (i.e., is "full-duplex capable"), based on the signals received at task 401.

At task 403, if router 102 is full-duplex capable, task execution proceeds to task 404. Otherwise, task execution proceeds to task 406.

At task 404, if network elements other than a first network element and a second network element are connected to switch 211—for instance, element 104-1 is in fact connected—then task execution proceeds to task 408. Otherwise, task execution proceeds to task 405.

At task 405, switch 211 establishes a link in the receive direction at the first data rate between router 102 and switch 211, in accordance with the illustrative embodiment of the present invention. Switch 211 selects the link in the receive direction over a different link (e.g., the link in the transmit direction to router 102, a link with a different network element, etc.) based on the determination that router 102 is full-duplex capable. As those who are skilled in the art will appreciate, in some alternative embodiments, switch 211 can select another link or combination of links, such as setting both the transmit and receive links with router 102 to the first data rate. Furthermore, in some embodiments switch 211 selects the first data rate over the second data rate based on one or more of the following criteria having been met:

i. exactly two devices are connected to switch 211;
  ii. less than three devices are connected to switch 211;
  iii. exactly two devices are connected to switch 211, where one of the devices is an upstream device connected to port 304, such as router 102;
  iv. exactly two devices are connected to switch 211, where one of the devices is a predetermined type, such as an end-user telecommunications device;
  v. any device is connected to a predetermined data port at switch 211, such as port 305 that is reserved for IP phone 212; and
  vi. signals have been received (as described with respect to task 401) that convey information that correlates to the processor speed, or some other attribute, of a connected network element such as IP phone 212.

As those who are skilled in the art will appreciate, the selection of the first data rate over the second data rate can be based on other criteria not listed above and on other combinations of criteria.

In some embodiments, when router 102 and IP phone 212 are the only network elements that are connected to switch 211, the switch also establishes a link in the transmit direction at the first data rate. As those who are skilled in the art will appreciate, the first data rate can be selected for the link in the transmit direction, based on other criteria such as the criteria already applied to the receive direction. In any event, task execution then proceeds to task 409.

At task 406, if network elements other than a first network element and a second network element are connected to switch 211—for instance, element 104-1 is in fact connected—then execution proceeds to task 408. Otherwise, task execution proceeds to task 407.

At task 407, switch 211 establishes a half-duplex link at the first data rate between router 102 and switch 211, in accordance with the illustrative embodiment of the present invention. Switch 211 selects the first data rate over the second data rate based on one or more of the following criteria having been met:

i. exactly two devices are connected to switch 211;
  ii. less than three devices are connected to switch 211;
  iii. exactly two devices are connected to switch 211, where one of the devices is an upstream device connected to port 304, such as router 102;

iv. exactly two devices are connected to switch 211, where one of the devices is a predetermined type, such as an end-user telecommunications device;

vii. any device is connected to a predetermined data port at switch 211, such as port 305 that is reserved for IP phone 212; and v. signals have been received (as described with respect to task 401) that convey information that correlates to the processor speed, or some other attribute, of a connected network element such as IP phone 212.

As those who are skilled in the art will appreciate, the selection of the first data rate over the second data rate can be based on other criteria not listed above and on other combinations of criteria. In any event, task execution then proceeds to task 409.

At task 408, switch 211 establishes a link between router 102 and switch 211 at the highest data rate in common between the two devices, in well-known fashion.

At task 409, if element 104-1 (i.e., the third network element) has been connected since the time that the link was established, task execution proceeds to task 410. Otherwise, task execution ends.

At task 410, switch 211 determines, in well-known fashion, that element 104-1 is capable of communicating at the first data rate (e.g., 10 Megabits/second, etc.) and the second data rate (e.g., 100 Megabits/second, etc.). In some embodiments, the first data rate is the lowest data rate that is supported by both router 102 and IP phone 212. Switch 211 might also determine that element 104-1 is able to communicate at additional data rates that are unique or in common with the data rates that are supported by one or more of the other connected devices. The determination of the data rates is based on the signals received when element 104-1 was connected to switch 211.

At task 411, switch 211 reestablishes a link at the second data rate between router 102 and switch 211, in accordance with the illustrative embodiment of the present invention. In accordance with the illustrative embodiment, the second data rate is the highest data rate that is supported by both router 102 and switch 211. However, as those who are skilled in the art will appreciate, in some alternative embodiments, the second data rate can be the highest data rate that is supported by all of router 102, switch 211, and another connected network element, where the other connected element might be specifically IP phone 212 or might be any device that merely connected at a predetermined data port (i.e., port 305). Switch 211 selects the second data rate over the first data rate based on a third device having been connected to the switch.

If router 102 is full-duplex capable, the link with router 102 that switch 211 reestablishes is the link in the receive direction. As those who are skilled in the art will appreciate, in some alternative embodiments, switch 211 can select another link or combination of links, such as setting both the transmit and receive links with router 102 to the second data rate. However, if router 102 is not full-duplex capable, switch 211 reestablishes a half-duplex link with router 102 at the second data rate. In any event, task execution ends after task 411.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
    receiving, at a network switch, a first signal from a first network element and a second signal from a second network element,
    wherein the first network element is an upstream device and the second network element is a device whose processor needs overload protection,
    wherein the first network element is connected to a first data port that is full-duplex capable at the network switch,
    and wherein the second network element is connected to a second data port at the network switch;
    determining, at the network switch, that (i) the first network element is full-duplex capable and (ii) the first network element and the second network element are each capable of communicating at least at a first data rate and a second data rate, wherein the first data rate is less than the second data rate;
    establishing, at the network switch, a link in a receive direction at the first data rate from the first network element to the network switch,
    wherein the link in the receive direction is established to transmit data from the first network element to the second network element,
    wherein the establishment of the link in the receive direction is based on the determination that the first network element is full-duplex capable;
    after the link is established at the first data rate, receiving a third signal at the network switch from a third network element,
    wherein the third network element is a device whose processor does not need overload protection,
    wherein the third network element is connected to a third data port at the network switch;
    determining, at the network switch, that the third network element is capable of communicating at least at the first data rate and the second data rate;
    and reestablishing, at the network switch, the link in the receive direction at the second data rate between the first network element and the network switch, wherein the second data rate is selected over the first data rate based on the third network element being connected to the network switch, and wherein the link in the receive direction is reestablished to send data from the first network element to the third network element when the third network element is connected.

2. The method of claim 1 wherein the first network element is upstream of the network switch, and wherein the second network element is an end-user telecommunications device.

3. The method of claim 2 wherein the network switch and the second network element are integrated into a physical enclosure of a telephone deskset.

4. The method of claim 2 further comprising receiving a fourth signal, which is from the second network element, wherein the fourth signal conveys information that correlates to the processor speed of the end-user telecommunications device.

5. A method comprising:
receiving, at a network switch, a first signal from a first network element and a second signal from a second network element,
wherein the first network element is an upstream device and the second network element is a device whose processor needs overload protection,
wherein the first network element is connected to a first data port at the network switch,
and wherein the second network element is connected to a second data port at the network switch;
determining, at the network switch, that the first network element and the second network element are each capable of communicating at least at a first data rate and a second data rate, wherein the first data rate is less than the second data rate;
when the first network element and the second network element are the only network elements connected to the network switch, establishing a link in a receive direction at the first data rate between the first network element and the network switch,
wherein the link in a receive direction is established based on a determination that the first network element is full-duplex capable,
and wherein the link in the receive direction is established to transmit data from the first network element to the second network element;
receiving, at the network switch, a third signal from a third network element,
wherein the third network element is a device whose processor does not need overload protection,
wherein the third network element is connected to a third data port at the network switch;
determining, at the network switch, that the third network element is capable of communicating at least at the first data rate and the second data rate;
and reestablishing the link at the second data rate between the first network element and the network switch, wherein the second data rate is selected over the first data rate based on the third network element being connected to the network switch, and wherein the link in the receive direction is reestablished to send data from the first network element to the third network element when the third network element is connected.

6. The method of claim 5 wherein the first network element is upstream of the network switch, and wherein the second network element is an end-user telecommunications device.

7. The method of claim 5 wherein the network switch and the second network element are integrated into the physical enclosure of a telephone deskset.

8. The method of claim 6 further comprising receiving a fourth signal, which is from the second network element, wherein the fourth signal conveys information that correlates to the processor speed of the end-user telecommunications device.

9. A method comprising:
receiving, at a network switch, a first signal from a first network element and a second signal from a second network element,
wherein the first network element is an upstream device and the second network element is a device whose processor needs overload protection,
wherein the first network element is connected to a first data port at the network switch,
and wherein the second network element is connected to a second data port at the network switch;
determining, at the network switch, that the first network element and the second network element are each capable of communicating at least at a first data rate and a second data rate, wherein the first data rate is less than the second data rate;
and establishing, at the network switch when the first network element and the network switch are both full-duplex capable, a link in a receive direction from the first network element to the network switch at the first data rate between the first network element and the network switch,
wherein the link in the receive direction is established to transmit data from the first network element to the second network element,
wherein the first data rate is selected over the second data rate based on at least one of: (i) the second network element being connected to the second data port, wherein the second data port is predetermined, and (ii) the second network element being connected to the network switch, wherein the second network element is predetermined,
and wherein the link in the receive direction is reestablished at the second data rate to send data from the first network element to a third network element when a third network element is connected;
wherein the third network element is capable of communicating at least at the first data rate and the second data rate,
wherein the third network element is a device whose processor does not need overload protection.

10. The method of claim 9 wherein the first network element is upstream of the network switch, and wherein the second network element is an end-user telecommunications device.

11. The method of claim 9 wherein the first data rate is selected over the second data rate based on the second network element being connected to the second data port.

12. The method of claim 9 wherein the network switch and the second network element are integrated into the same physical enclosure.

13. The method of claim 9 wherein the network switch and the second network element are integrated into a physical enclosure of a telephone deskset.

14. The method of claim 10 further comprising receiving a third signal, which is from the second network element, wherein the third signal conveys information that correlates to the processor speed of the end-user telecommunications device.

15. The method of claim 9 wherein the first data rate is the lowest data rate that is supported by both the first network element and the second network element.

* * * * *